Aug. 16, 1966     K. K. K. KRØYER     3,266,879
PROCESS OF MAKING A CRYSTALLIZABLE GLASS MATERIAL
Filed Oct. 21, 1963     2 Sheets-Sheet 1

INVENTOR.
Karl K. K. Krøyer
BY
Watson, Cole, Grindle & Watson
ATTORNEYS

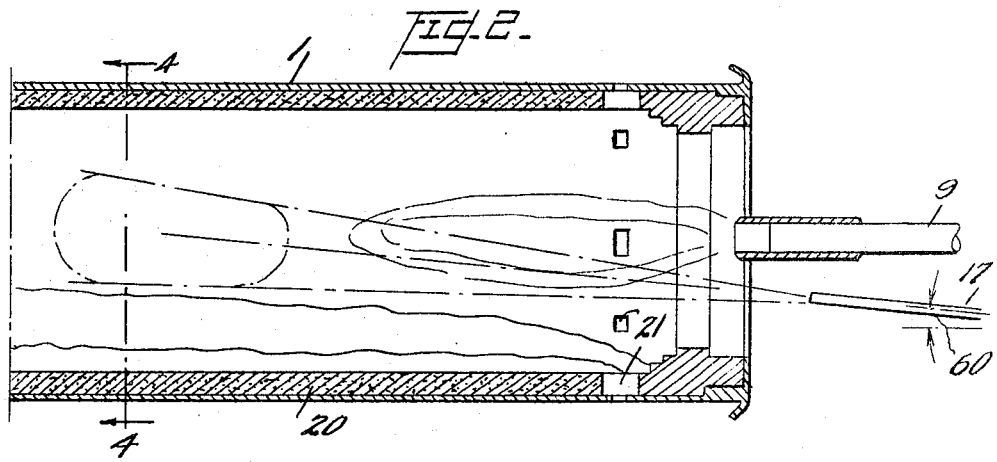
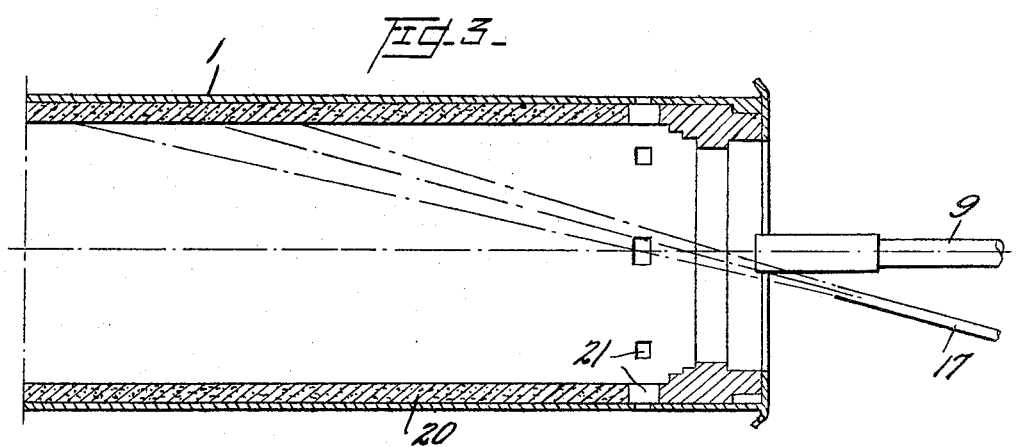
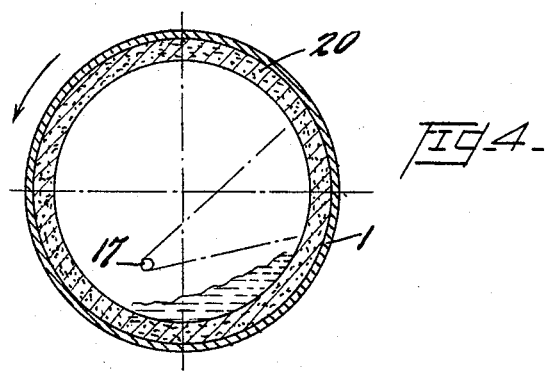
INVENTOR
*Karl K. K. Krøyer,*
BY
*Watson, Cole, Grindle & Watson*
ATTORNEYS 3,266,879
PROCESS OF MAKING A CRYSTALLIZABLE
GLASS MATERIAL
Karl Kristian Kobs Krøyer, Vester Kongevej 80,
Aarhus-Viby, Denmark
Filed Oct. 21, 1963, Ser. No. 317,691
Claims priority, application Denmark, Oct. 23, 1962,
4,559/62
7 Claims. (Cl. 65—21)

This invention relates to a process of making a crystallizable glass material particularly for use in the production of an aggregate for construction materials, more particularly road construction materials.

Grains of crystallized or devitrified glass have many advantageous properties for the use referred to and particularly as an aggregate for road construction materials.

Owing to the crystal form, devitrified glass has a suitable color shade (generally whitish) to make the whole road surface bright when illuminated by headlights or the like at night. This color shade becomes apparent as soon as the binder of the road construction material such as asphalt has been worn off at the surface.

Devitrified glass is hard and wear resistant but not brittle.

It is non-hygroscopic and resistant to moisture, oil and all chemical influences to which it may be subjected during use.

As contrasted to ordinary glass, it is not polishable, so that notwithstanding the wear to which it is subjected by the traffic, it always retains a sufficient roughness to give the road surface suitable anti-skidding properties.

It has good light-reflecting properties without a glaring effect such as is characteristic of amorphous glass particularly when the latter is polished by the traffic.

It is relatively inexpensive because simple and inexpensive constituents may be used for the glass bath from which the material is produced because extreme purity is not essential.

Grains of devitrified glass may also be used as an aggregate in concrete, and the use of devitrified glass as an aggregate is not limited to road construction materials but may be extended to other construction materials, where the special character of the aggregate is found to be advantageous.

The production of the glass material to be brought into crystalline form and into the physical form of grains for the purposes of the uses above referred to takes place on principle in the same manner as the production of other glass materials, viz. by the melting of materials containing the constituents of the desired glass material, viz. silica and various metal oxides and possibly other oxides. After a molten bath of the desired glass mass has been made in this manner, this may be granulated by sudden cooling and then reheated for crystallization. The general principles of this method are described in my U.S. Patent No. 3,073,708 of January 15, 1963.

However, this invention relates principally to the first stage of this process, viz. the production of the molten glass.

Up to now, it has been customary to use stationary melting tanks for the production of glass materials. In order to obtain a simplification and a reduction of the expenses in the production, it has also been proposed to use rotary kilns for the melting, cf. my above mentioned Patent No. 3,073,708 of January 15, 1963. However, this meets with the difficulty that the lining of the rotary kiln is very strongly attacked by the molten mass, so that the operation has to be interrupted at relatively short intervals for the purpose of exchanging the lining, which results in very heavy expenses.

It is an object of the invention to remedy this drawback so that it becomes possible to use rotary kilns for the melting in an efficient manner. According to the invention, a process of making a crystallizable glass material comprises the step of supplying raw materials suitable for forming a crystallizable glass material partly at the upper end of an inclined rotary kiln, partly by injection from the lower end of said rotary kiln in such a manner that a substantial part of said injected raw material is distributed over the whole of the burning zone of said rotary kiln.

It has been found that in this manner the attack of the molten bath on the lining of the rotary kiln is considerably reduced. A probable explanation of this phenomenon is that the raw material injected from the lower end of the rotary kiln is not immediately heated to the melting temperature but at first only assumes a plastically semiliquid or viscose condition and has therefore a tendency to adhere to the wall of the rotary kiln so as to form a protecting layer between the molten mass and the lining of the kiln. The protection is ascribable in part to the fact that the material of the layer is at a somewhat lower temperature than the molten mass, and partly also to the fact that this material is more viscose than the molten mass and therefore has less tendency to penetrate into the lining or to enter into intimate combination with and thereby decompose the latter. Only after some delay is the injected raw material mixed with the molten mass of the raw materials supplied to the upper end of the rotary kiln, and in the meantime, additional raw material has been injected which now forms a protecting layer on the wall of the rotary kiln.

Besides forming a protecting layer, the injected raw material also has the effect of exerting a certain cooling on the molten bath. This cooling also serves to protect the lining. On the other hand, the cooling does not adversely affect the melting together of the raw materials seeing that once the raw materials have assumed the temperature necessary to melt them homogeneously together, they will continue forming a molten and homogenous mass even if a certain cooling subsequently takes place. Moreover, this somewhat cooled mass will be capable of incorporating additional particles of the raw materials when these are reasonably homogenously mixed into the molten mass. For the purposes of the operation immediately following the melting, when using the process for the production of an aggregate, viz. a granulation by sudden cooling, it is also advantageous that the molten material is caused to leave the rotary kiln at a somewhat lower temperature than would otherwise have been the case, because this makes it easier to obtain the relatively coarse granulation desirable in the production of an aggregate.

An additional advantage is to be seen in the improvement of the heat economy resulting from the fact that at least part of the amount of heat required for heating the injected raw material does not incur any fuel consumption, because this quantity of heat is made available by a cooling of the molten mass which is useful and otherwise could not be obtained.

It is important that the injected raw material should be distributed over the whole of the burning zone, i.e. the zone from the lower end of the kiln to somewhat above the point where maximum temperature prevails in the interior of the kiln, because the lining is particularly subjected to attack in the whole of this zone.

If the injected raw material should not in its entirety be homogenously molten together with the molten mass of the raw materials supplied at the upper end of the rotary kiln, this circumstance may be utilized to advantage in the production of an aggregate particularly for road construction materials, because the particles that have not been completely molten will contribute towards increasing the roughness of the grains of devitrified glass made from the molten mass. Moreover, these particles will act as crystallization germs in the crystallization process, which may take place by slow cooling of the molten mass or by the re-heating of grains produced by sudden cooling of the molten mass.

As an additional advantage of the process according to the invention, it is to be mentioned that it opens up the possibility of producing materials of a composition which might otherwise hardly be produced in a rotary kiln because a too high melting temperature would be required. Thus, in carrying out the process according to the invention, the possibility exists of first melting a mixture of raw materials having a moderate melting temperature, and then increasing the proportion, in the molten mass, of one or more constituents which may be the same or partly the same as some of the constituents of the raw materials supplied at the upper end of the rotary kiln.

With a view to making use of this advantage in carrying out the process according to the invention, the part of raw materials injected from the lower end of the rotary kiln may advantageously be constituted by part of a constituent imparting to the mixture of raw materials a melting point higher than that of the mixture of raw materials supplied at the upper end of the rotary kiln. Hereby it also becomes possible to obtain a particularly good protection of the lining, because the injected raw material will be particularly inclined to remain for some time in semi-liquid condition so as to form a protecting layer on the wall of the rotary kiln before being mixed into the molten mass. An additional advantage of selecting a single constituent for the injection from the lower end of the rotary kiln is that it becomes superfluous to mix a plurality of constituents for injection or to employ distinct injection devices for each of a plurality of constituents. This would be considerably more complicated than mixing the constituents supplied at the upper end of the rotary kiln where the constituents need not be injected but may be supplied through chutes, and where the constituents may if desired be supplied in wet condition, even in the form of a slurry, seeing that the constituents then just have to be dried during the first part of their travel through the rotary kiln where the temperature is relatively low.

Preferably, according to the invention, the constituent injected from the lower end of the rotary kiln may be silica, e.g. sand. This is a raw material which is practically always employed in the production of glass and it fulfills all the conditions set forth above. Moreover, it is a relatively cheap raw material since it is practically always available in the immediate neighbourhood of the place where it is to be used. Moreover, sand is as a rule available in a sufficiently dry state to be directly used for blowing into the rotary kiln. By using the ordinary quantity of sand in the raw materials supplied at the upper end of the rotary kiln, and injecting additional sand from the lower end of the rotary kiln, a material may be obtained which contains a higher proportion of silica than could be obtained by ordinary melting in a rotary kiln. This is an economic advantage.

In order to increase the tendency of the injected raw material to form a protecting layer on the wall of the rotary kiln, the injection of raw material from the lower end of the rotary kiln may according to the invention advantageously be effected in such a manner that a substantial part of the injected raw material will strike the wall of the rotary kiln above the molten bath formed by the raw materials supplied at the upper end of the rotary kiln, preferably in the form of a jet directed at an inclination to the axis of the rotary kiln towards the upwardly moving part of the wall of the rotary kiln. The injected material which is already heated by the temperature prevailing in the kiln before striking the wall of the kiln will thereby have a better possibility of adhering to said wall in a plastic condition before the wall again plunges into the molten bath at the other side of the kiln.

Moreover, in this manner the part of the lining at any time present at any time present at the top receives a maximum of protection, which is very advantageous because the upper part of the lining receives the greatest amount of heat.

The invention will now be described in further detail with reference to the accompanying drawings in which:

FIGURE 2 is a vertical sectional view of the right end of the rotary kiln as viewed in FIGURE 1;

FIGURE 3 is a horizontal sectional view of the right end of the rotary kiln as viewed in FIGURE 1; and FIGURE 4 is a cross sectional view taken along the line A—A of FIGURE 2.

Figure 1:
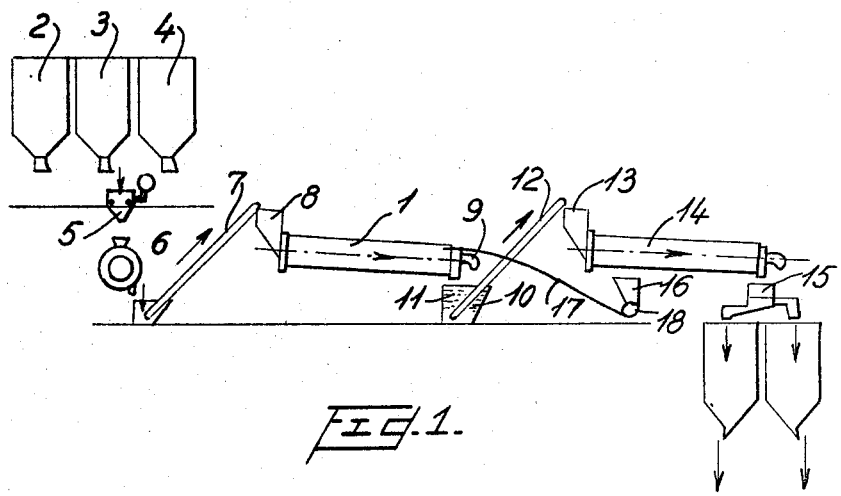
FIGURE 1 shows diagrammatically a plant for carrying out the process according to the invention.

Raw materials such as sand, chalk and dolomite are mixed and heated in an inclined rotary kiln 1 which may be of the type used in the cement industry. As an example, which is by no means limitative, the rotary kiln may have an inner diameter of 2.6 meters and a length of 70.0 meters and may be disposed at an inclination of 4%. The speed of rotation may be ½–1 revolution per minute. The supply of raw materials is diagrammatically represented by three hoppers 2, 3 and 4, a movable weighing apparatus 5, a mixing drum 6, a conveyor 7 and a funnel 8. As will be seen, the raw materials are continuously introduced at the upper end of the kiln. The heating is performed in counter current by means of an oil burner 9 at the lower end of the kiln. It is observed that thorough mixing of the raw materials is by no means essential seeing that a mixing will take place during the first part of the travel of the raw materials through the kiln. Preferably, the raw materials are in powder form and may be supplied either dry or in the form of a sludge. In the latter case, drying of the materials will take place during the first part of the travel through the kiln.

During the travel, the raw materials are gradually heated, and when their temperature reaches the softening point, the particles will coalesce to form a dam from which the materials gradually melt completely and flow in molten condition through the last part of the kiln.

From the lower end of the kiln, sand is at the same time blown into the kiln from a hopper 16 through a pipe 17 by means of a blower 18 provided at the bottom of the hopper 16. The pipe 17 extends into the kiln at the lower end thereof (see FIGS. 2, 3 and 4), and is directed at an inclination to the axis of the kiln towards the upwardly moving part of the wall of the kiln at an angle such that the injected sand is distributed over the whole of the burning zone. Some of the injected sand drops directly onto the molten bath in the kiln and is incorporated therein, and some strikes the wall of the kiln forming a protective layer 20 which adheres thereto in a softened and sticky state so as to be carried along by the wall of the kiln before the latter is again submerged into the molten bath.

As an example, the temperature of the kiln may be kept at about 1500° C. at the hottest zone which is located somewhat higher up than the tip of the flame of the burner, and about 500° C. at the lower end of the kiln. The supply of raw materials may amount to 240 metrical tons per 24 hours, and the output of molten material pouring out from the lower end of the kiln will then be about 200 metrical tons per 24 hours. In the example corresponding to the figures specified, the time of travel from one end of the kiln to the other will be about three hours. The stream of glass pouring out at the lower end of the kiln which may be through outlet openings 21 flows directly into a water bath 10 in a vessel 11 to which fresh water is supplied as required by means not shown. When suddenly cooled in the manner described, the material is immediately solidified and granulated and then falls on to an inclined conveyor 12 which carries the material out of the water bath. The granulation has been substantially completed upon cooling of the material from 1500° C. to about 600–900° C. Since this cooling takes place very rapidly, there is no need for keeping the material in the water very long. The time of stay in the water may e.g. be about ½ minute. When the material leaves the water, it may still be relatively hot, e.g. up to 500–600° C.

The material leaving the conveyor 12 may, if desired, be kept in stock for later reheating. However, in the example shown, this material is directly transferred by means of the conveyor 12 and a funnel 13 to a second rotary kiln 14. This kiln may be identical with the kiln 1. Only the temperature is kept lower, so that the temperature of the material does not exceed about 1150° C. In this reheating stage, a devitrification takes place, i.e. crystals are formed in the grains. The crystallization commences only in the neighbourhood of 1150° C., so the heating taking place during the preceding part of the travel has no effect on the crystallization of the product, but will to some extent remove inner stresses resulting from the granulation. It has been found that only a very short time is necessary for crystallization at the maximum temperature. Laboratory tests in which individual grains have been heated in an electric furnace have shown that the crystallization is completed in about 10 minutes at 1150° C.

If the temperature exceeds 1150° C. in the example here under consideration, there will be a too strong tendency to coalescing. At 1150° C. there is no coalescing but the crystallization proceeds quickly. It is characteristic of the specific compositions to be mentioned below that the crystallization can take place without complete melting and without coalescing, which is not possible with ordinary glass material.

The crystallization tendency may be promoted by suitably selecting the composition of raw materials. It has been found that the sudden cooling of the molten material in a water bath also promotes the crystallization tendency. Moreover, crystallization is promoted if the material is not completely vitrified in the kiln but a certain amount of not completely molten seeds or nuclei of the material are left in the molten mass. Therefore, it is by no means disadvantageous if the sand injected from the lower end of the kiln is not completley molten, but on the contrary this will have the advantage of promoting the crystallization tendency.

The product leaving the second rotary kiln 14 at the lower end thereof is a material consisting of grains of devitrified glass. In physical tests it has been found that the grain size of a product produced in the manner described will predominantly be in the range from 0–12 mm. screen size. In the drawing, a screening arrangement 15 is shown by means of which the product can be separated into two different grades, e.g. 0–3 and 3–12 mm., but of course a finer grading is also possible. To illustrate the relative heat treatment in the two stages of the process, it may be mentioned that in practical operation the oil consumption in the first kiln under the conditions specified was found to be 26 metrical tons per 24 hours against 7 tons per 24 hours in the second kiln. If kilns of greater lengths are used, the oil consumption may be reduced.

One example of raw materials that may be used in carrying out the process according to the invention is as follows:

For the production of 100 parts by weight of primary molten mass plus 13.5–27 parts by weight of injected material, in total 113.5–127 parts by weight final product, the following raw materials may be used calculated as dry materials:

At the upper end of the kiln: Parts by weight
 Dune sand _____ 66
 Chalk or lime _____ 40
 Dolomite _____ 13

At the upper end of the kiln: Parts by weight
 Dune sand _____ 13.5–27

In tests carried out with raw materials of the composition specified, the following analysis of the final product has been found.

| | Percent |
|---|---|
| $SiO_2$ | 70 |
| $CaO$ | 21 |
| $MgO$ | 3 |
| $Al_2O_3$ | 4 |
| $Fe_2O_3$ | 1 |
| $K_2O$ or $Na_2O$ | 1 |

$SiO_2$ is derived from the sand, CaO from the chalk or lime, MgO from the dolomite, $Al_2O_3$ from the sand which contains a small proportion of feldspar. $Fe_2O_3$ is an impurity which is hard to avoid and is not fatal as long as the proportion is low, but higher proportions of $Fe_2O_3$ are very objectionable because they result in miscoloring. $K_2O$ and $Na_2O$ are derived from the feldspar in the sand and are not undesirable in small quantities. Somewhat larger quantities might be used, but this would necessitate the use of more expensive raw materials and does not result in any advantages for the purpose here in question.

As another example of the raw materials, the following may be mentioned:

For the production of 100 parts by weight of primary molten mass plus 13.5–27 parts by weight of injected material, in total 113.5–127 parts by weight of final product, the following raw materials may be used, calculated as dry materials.

At the upper end of the kiln: Parts by weight
 Pure quarz sand _____ 59
 Lime _____ 45
 Feldspar _____ 14
At the lower end of the kiln:
 Pure quarz sand _____ 13.5–27

In tests with this composition of raw materials, the following analysis has been found:

| | Percent |
|---|---|
| $SiO_2$ | 73 |
| $CaO$ | 21 |
| $Al_2O_3$ | 3 |
| $K_2O+Na_2O$ | 2 |
| Impurities, mainly iron compounds | 1 |

It will be understood that similar products may be made from other raw materials which may be chosen from the point of view of availability and price. The analysis will determine the amount of the various ingredients to be used according to principles well known in the glass industry.

It is characteristic of the products in question that they contain a very high percentage of CaO which, as will be seen, forms the predominant constituent besides $SiO_2$. However, part of the CaO may be replaced by MgO, and also other metals such as beryllium or strontium or lead in the form of red lead ($Pb_3O_4$) may be substituted in part for CaO if this is found preferable. It should be understood, however, that the other ingredients present are not entirely unimportant but should preferably comprise such ingredients as have the effect of reducing the melting point. The MgO of the dolomite of the first example has this effect to some extent, and also the small quantities of $K_2O$ and $Na_2O$ present in both examples act as fluxing agents without destroying the crystallizing properties. The small proportion of $Al_2O_3$ has a somewhat similar effect. Other fluxing agents such as fluorspar and calcium phosphate could also be used. Fluorspar, however, is relatively expensive and may lead to inconveniences in poisoning the atmosphere. Calcium phosphate is relatively expensive as a raw material at most locations, but where e.g. phosphate rock is available at low price, this can be used with advantage.

The experiences obtained from a long series of experiments indicate that a preferable composition of raw materials for the melting process will be such as to keep the following limits for the analysis of the product:

| | |
|---|---|
| $SiO_2$ | Above 60%. |
| $CaO+MgO$ | Above 20%, preferably above 25%. |
| $Al_2O_3$ | Below 3%. |
| $K_2O+Na_2O$ | Below 5%, preferably below 1%. |
| $Fe_2O_3$ | Below 1%. |
| S | Below ½–1%. |
| C | Traces. |

As regards sulphur, it is observed that this has the disadvantage of giving rise to dark coloring of the product and should therefore be avoided as far as possible, but small percentages such as ½–1% will not be fatal. C in the form of carbide compounds is very objectionable in likewise miscoloring the product, and therefore only traces of C would be permissible.

Some remarks will now be given on the character of the product and the manner in which this may be incorporated in a road construction material.

As previously mentioned, the grain size of the product will usually be in the range 0–12 mm. screen size. This product may be graded into different ranges according to requirements. Usually, the finer grade from 0–3 mm. will be separated from the remainder to be used for special purposes where a high skid proofness is not a principal requirement. Grain sizes from 3–12 mm. have been found to be suitable for ordinary road surfaces. Best results are obtained with grain sizes from 3–6 mm. for road carpets, and at least 6 mm. for mastic and compressed asphalt. Grains within these ranges are large enough to break the water film on a wet road, so that the road surface does not reflect the light like a mirror, and besides, these grain sizes offer an excellent friction for the wheels of vehicles.

The grains may be produced completely compact or with minute cavities as desired. In the latter case, it is desirable that the cavities should not form continuous pores but should be discrete, so that the material does not assume a porous character. The cavities will make the product less polishable by the traffic and besides, will increase the adhesion between the grains and the binder, because the latter will be able to penetrate to some extent into the cavities present in the surface of the grains. It has been found that a total volume of the cavities amounting to 5–15% and a maximum diameter of the cavities of about 0.5 mm. or even lower such as about 0.2 mm., will be preferable. This amount of cavities will reduce the specific gravity of the grains to 2.2–2.3 as against a specific gravity of 2.5–2.6 of the compact product. Cavities may be formed very easily in the rotary kiln presumably because air is continuously introduced into the molten material owing to the rotation of the kiln, or this rotation prevents the occluded gases from escaping. Only the larger bubbles will escape, while the smaller bubbles are retained. As an alternative or supplement to the irregularity of the surface obtainable by the formation of cavities, a certain roughness of the surface may also be obtained by the presence of non-vitrified or incompletely vitrified particles in the grains. This may be obtained by suitably selecting the proportion and nature of the raw materials injected from the lower end of the rotary kiln. Such particles will be embedded in the material of the finished grains and may be more or less fused together with the latter without, however, being completely vitrified. The presence of such particles will contribute towards making the grains less polishable and increasing the adhesion between the grains and the binder.

An aggregate produced by the process according to the invention may be worked into road construction materials in similar manner as aggregate from other sources. It has been found that suitable light-reflecting properties can be obtained also if the new aggregate material is mixed with usual aggregate materials. One example of a road construction material in which the aggregate produced by the process according to the invention is incorporated is a material for making road carpets having the following composition:

| | Percent |
|---|---|
| Devitrified glass grains of 3–6 mm. screen size | 30 |
| Other stone material having grain sizes of 0–6 mm. screen size, at least 5½% thereof falling within the range below 0.074 mm. (filler) | 58 |
| Filler | 5½ |
| Asphalt | 6½ |

This road carpet material may be laid in an amount of 40 kg./m.$^2$

As another example, the aggregate made by the process according to the invention, may be used for road surfaces consisting of mastic and compressed asphalt, where the grains are scattered upon the surface of the asphalt and are then rolled into the latter, the excess of aggregate being subsequently swept off for renewed use. In this case, the asphalt layer may have a thickness of about 5 cm. and the amount of devitrified glass grains may be about 5 kg./m.$^2$ together with another 5 kg./m.$^2$ of other stone material. In this case, grain sizes from 6 mm. upwards are preferably used.

The aggregate material made by the process according to the invention may also be used in concrete, and the use of the aggregate material is not limited to road construction materials, but on the contrary it may be used for any other building materials, where the special character of the grains of devitrified glass is found advantageous.

I claim:

1. A process of making a crystallizable glass material comprising the steps of continuously supplying part of a selected composition of raw materials suitable for forming a crystallizable glass material to the upper end of an inclined rotary kiln, keeping said rotary kiln at a temperature sufficient to melt the raw materials supplied to the upper end thereof during their passage therethrough to form a molten bath flowing downwards through the lower part of said rotary kiln, continuously injecting the remainder of said selected composition of raw materials from the lower end of said rotary kiln in the form of a blast striking the wall of said rotary kiln above said molten bath over the whole of the burning zone of said rotary kiln, thereby gradually to be incorporated in said molten bath, and causing the molten material thus formed to flow off from the lower end of said rotary kiln.

2. A process of making a crystallizable glass material, comprising the steps of continuously supplying part of a selected composition of raw materials suitable for forming a crystallizable glass material to the upper end of an inclined rotary kiln, keeping said rotary kiln at a temperature sufficient to melt the raw materials supplied to the upper end thereof during their passage therethrough to form a molten bath flowing downwards through the lower part of said rotary kiln, continuously injecting the remainder of said selected composition of raw materials from the lower end of said rotary kiln in the form of a jet directed at an inclination to the axis of said rotary kiln towards the upwardly moving part of the wall of said rotary kiln in the form of a blast striking the wall of said rotary kiln above said molten bath over the whole of the burning zone of said rotary kiln, thereby gradually to be incorporated in said molten bath, and causing the molten material thus formed to flow off from the lower end of said rotary kiln.

3. A process of making a crystallizable glass material, comprising the steps of continuously supplying to the upper end of an inclined rotary kiln a selection of glass forming raw materials, the analysis of which in a finished glass product made therefrom will show a content of more than 60% $SiO_2$ and more than 20% $CaO$, the total of said $SiO_2$ and $CaO$ equalling at least about 90%, keeping said rotary kiln at a temperature sufficient to melt the raw materials supplied to the upper end thereof during their passage therethrough to form a molten bath flowing downwards through the lower part of said rotary kiln, continuously injecting silica in a proportion of 13.5–27%, calculated on said analysis of a glass product made from the raw materials supplied to the upper end of said rotary kiln, from the lower end of said rotary kiln in the form of a blast striking the wall of said rotary kiln above said molten bath over the whole of the burning zone of said rotary kiln, thereby gradually to be incorporated in said molten bath, and causing the molten material thus formed to flow off from the lower end of said rotary kiln.

4. A process of producing an aggregate for road construction materials, comprising the steps of continuously supplying raw materials suitable for forming a crystallizable glass material partly at the upper end of an inclined rotary kiln, partly by continuous injection from the lower end of said rotary kiln in the form of a blast whereby a substantial part of said injected raw material is distributed over the whole of the burning zone of said rotary kiln, causing the molten material thus formed to flow off from the lower end of said rotary kiln, subjecting said molten material to sudden cooling to granulate same, and reheating said granulated material to devitrify same.

5. A process of producing an aggregate for road construction materials, comprising the steps of continuously supplying part of a selected composition of raw materials suitable for forming a crystallizable glass material to the upper end of an inclined rotary kiln, keeping said rotary kiln at a temperature sufficient to melt the raw materials supplied to the upper end thereof during their passage therethrough to form a molten bath flowing downwards through the lower part of said rotary kiln, continuously injecting the remainder of said selected composition of raw materials from the lower end of said rotary kiln in the form of a blast striking the wall of said rotary kiln above said molten bath over the whole of the burning zone of said rotary kiln, thereby gradually to be incorporated in said molten bath, causing the molten material thus formed to flow off from the lower end of said rotary kiln, subjecting said molten material to sudden cooling to granulate same, and reheating said granulated material to devitrify same.

6. A process of producing an aggregate for road construction materials comprising the steps of continuously supplying to the upper end of an inclined rotary kiln a selection of glass forming raw materials, the analysis of which in a finished glass product made therefrom will show a content of more than 60% $SiO_2$, and more than 20% $CaO$, the total of said $SiO_2$ and $CaO$ equalling at least about 90%, keeping said rotary kiln at a temperature sufficient to melt the raw materials supplied to the upper end thereof during their passage therethrough to form a molten bath flowing downwards through the lower part of said rotary kiln, continuously injecting silica in a proportion of 13.5–27%, calculated on said analysis of a glass product made from the raw materials supplied to the upper end of said rotary kiln, from the lower end of said rotary kiln in the form of a blast striking the wall of said rotary kiln above said molten bath over the whole of the burning zone of said rotary kiln, thereby gradually to be incorporated in said molten bath, causing the molten material thus formed to flow off from the lower end of said rotary kiln, subjecting said molten material to sudden cooling to granulate same, and reheating said granulated material to devitrify same.

7. A process as in claim 1 in which the proportion of raw material continuously injected from the lower end of said rotary kiln amounts to 10–25% by weight of the raw material supplied to the upper end of said rotary kiln, all raw materials being calculated as dry materials.

References Cited by the Examiner

UNITED STATES PATENTS

| | | | |
|---|---|---|---|
| 2,262,826 | 11/1941 | Willets | 65—26 |
| 2,878,004 | 3/1959 | Saeman | 263—32 |
| 3,073,708 | 1/1963 | Krøyer | 106—52 |

DONALL H. SYLVESTER, *Primary Examiner.*

G. R. MYERS, *Assistant Examiner.*